(12) United States Patent
D'Andrea et al.

(10) Patent No.: US 11,788,960 B2
(45) Date of Patent: Oct. 17, 2023

(54) DEVICE AND METHOD FOR DETECTING TIME-RESOLVED OPTICAL DATA

(71) Applicants: POLITECNICO DI MILANO, Milan (IT); CONSIGLIO NAZIONALE DELLE RICERCHE—CNR, Rome (IT)

(72) Inventors: Cosimo D'Andrea, Milan (IT); Gianluca Valentini, Milan (IT); Andrea Farina, Rome (IT); Simon Arridge, London (GB)

(73) Assignees: POLITECNICO DI MILANO, Milan (IT); CONSIGLIO NAZIONALE DELLE RICERCHE—CNR, Rome (IT)

( * ) Notice: Subject to any disclaimer, the term of this patent is extended or adjusted under 35 U.S.C. 154(b) by 111 days.

(21) Appl. No.: 17/262,461

(22) PCT Filed: Jul. 22, 2019

(86) PCT No.: PCT/EP2019/069625
§ 371 (c)(1),
(2) Date: Jan. 22, 2021

(87) PCT Pub. No.: WO2020/020805
PCT Pub. Date: Jan. 30, 2020

(65) Prior Publication Data
US 2021/0318239 A1    Oct. 14, 2021

(30) Foreign Application Priority Data

Jul. 23, 2018    (IT) .................. 102018000007424

(51) Int. Cl.
*G01N 21/64*    (2006.01)
*G01S 7/4863*    (2020.01)
(Continued)

(52) U.S. Cl.
CPC ..... *G01N 21/6408* (2013.01); *G01N 21/6456* (2013.01); *G01S 7/4863* (2013.01); *G01S 7/4865* (2013.01); *G01S 17/08* (2013.01)

(58) Field of Classification Search
CPC ........... G01N 21/6408; G01N 21/6456; G01S 7/4863; G01S 7/4865; H04N 25/40
See application file for complete search history.

(56) References Cited

U.S. PATENT DOCUMENTS

2006/0202129 A1    9/2006    Niclass et al.
2006/0239336 A1   10/2006    Baraniuk et al.
(Continued)

OTHER PUBLICATIONS

International Search Report dated Oct. 22, 2019 in PCT/EP2019/069625, 2 pages.
(Continued)

*Primary Examiner* — Thanh Luu
(74) *Attorney, Agent, or Firm* — Oblon, McClelland, Maier & Neustadt, L.L.P.

(57) ABSTRACT

A device is disclosed for detecting time-resolved optical data, the device comprising a sensor comprising a number of detection elements configured to detect a light signal in a single photon regime, a timing circuit connected to said number of detection elements though a common line, and a control module connected to the sensor, the control module being configured to selectively enable the detection elements of the sensor according to a set of enabling patterns. The timing circuit is configured to measure a time of arrival of an output signal from the detection elements on the common line, the output signal being indicative of the detection of a photon of the light signal by any of the enabled detection elements.

10 Claims, 5 Drawing Sheets

(51) Int. Cl.
  *G01S 7/4865* (2020.01)
  *G01S 17/08* (2006.01)

(56) References Cited

U.S. PATENT DOCUMENTS

| | | |
|---|---|---|
| 2010/0127160 A1 | 5/2010 | Niclass et al. |
| 2015/0070541 A1 | 3/2015 | Guicquero et al. |
| 2016/0033642 A1 | 2/2016 | Fluckiger |
| 2018/0045816 A1* | 2/2018 | Jarosinski ............ G01S 7/4863 |
| 2020/0335546 A1* | 10/2020 | Miura ............... H01L 27/14603 |
| 2020/0379095 A1* | 12/2020 | Kappel ................ G01S 7/4866 |

OTHER PUBLICATIONS

Richard G. Baraniuk, "Compressive Sensing", [Lecture Notes] IEEE Signal Processing Magazine, Jul. 2007, pp. 118-120, 124.

Marco F. Duarte, et al., "Single-Pixel Imaging via Compressive Sampling", IEEE Signal Processing Magazine, Mar. 2008, pp. 83-91.

Nam Huynh, et al., "Single-pixel optical camera for video rate ultrasonic imaging", Optica, vol. 3 No. 1, Jan. 2016, pp. 26-29 and Supplementary Material pp. 1-3.

* cited by examiner

DEVICE AND METHOD FOR DETECTING TIME-RESOLVED OPTICAL DATA

TECHNICAL FIELD

The present invention relates to the field of devices and methods for the detection of time-resolved optical data and, in particular, the acquisition of time-resolved images.

BACKGROUND ART

An image is acquired by illuminating a sample under investigation and measuring the light that is reflected and/or diffused by the sample. By means of suitable algorithms based on photon propagation models it is possible to recover geometrical as well as optical properties (dimension, distance, absorption, diffusion, fluorescence, etc.) of the sample itself.

In particular, the possibility of acquiring time-resolved images with high temporal resolution (down to picoseconds) finds application in various technical fields where the study of dynamic processes characterized by spatial variations is required.

Emerging applications that may benefit from the possibility of acquiring time-resolved images with high temporal resolution include remote sensing and imaging for the environmental monitoring and, in particular, for the automotive industry. For instance, the LIDAR (Light Detection and Ranging) technique can provide data on the distance of objects by determining the time of flight of laser pulses. In particular, interest is growing for emerging research fields such as self-driving vehicles, which require mapping of fast changing scenarios.

Other fields of application include biology, medicine and material science. In particular, time-resolved images can be employed in time-resolved spectroscopy investigations, which can be used to analyse the optical properties (i.e. absorption, scattering, reflectivity, fluorescence) of a plurality of materials. In medicine as well as in industrial research, highly scattering media (e.g. biological tissues, food products, wooden materials, pharmaceutical and powder samples) are typically investigated for applications including diagnostics and quality control. As known, in medicine, many diagnostic techniques are based on the study of images acquired by light propagation inside human body tissues (e.g., optical mammography, functional neuroimaging, oximetry, etc.). The optical properties of the tissues can in fact provide useful information regarding the presence of, e.g., tumors or other pathologies affecting the examined tissues. Other applications comprise functional imaging and assisted surgery.

The availability of time information allows to recover with greater precision and to disentangle the absorption and scattering properties of the medium in which the light propagates. Furthermore, in the biomedical field, the "Fluorescence Lifetime Imaging" (FLIM) technique allows obtaining an image of a sample based on the differences in the exponential decay rate of fluorescence, and in this way it allows obtaining important information on the sample itself, such as pH, ion concentration ($Ca^{++}$, $Mg^{++}$, etc.), molecular coupling (Fluorescence Resonance Energy Transfer, FRET).

The acquisition of time-resolved images of a sample under investigation typically takes place in two distinct ways. A first approach is based on the use of so-called gated digital cameras (or video cameras), typically comprising ICCD (Intensified Charge-Coupled Device) cameras. These cameras allow opening a short time window (with a minimum width of about 100 ps) to detect the light reflected and/or emitted by the sample within this window, upon illumination with a period sequence of light pulses. The time window can be repeatedly shifted over time to perform a time sampling and acquire digital images at successive time points. Gated cameras typically include an array of photodetectors.

A second approach is based on the use of systems comprising a single photodetector used to raster scan the sample. In these systems, time sampling is performed by coupling the photodetector with an electronic board which can, for example, implement the known "Time-Correlated Single-Photon Counting" technique (TCSPC).

In recent years, a further approach has been proposed, referred to as "Single Pixel Camera". This approach involves replacing the array of photodetectors with a spatial optical modulator (for instance, a Digital Micromirror Device, DMD) coupled to a single photodetector. The image of the object is formed by an optical system (for example, a lens) on the spatial optical modulator, whose reflection/transmission properties are adjusted by a specific modulation pattern, and the light emitted by it (which corresponds to the inner product of the image with the specific modulation pattern) is focused on the single photodetector. By changing the modulation pattern, the image is sampled in the spatial frequency domain. The image of the object under investigation can be reconstructed by finally applying an inversion algorithm.

US 2006/0239336 A1 describes a camera or video camera which implements the Single Pixel Camera mechanism described above. In particular, the camera directly acquires random projections of the incident light field without first acquiring pixel/voxel data. In a preferred embodiment, the camera employs a matrix of digital micro-mirrors to perform optical calculations of linear projections of an image on pseudo-random binary patterns.

SUMMARY OF THE INVENTION

The Single Pixel Camera scheme enables the hardware implementation of what is expected from the mathematical theory known as "compressed sensing". According to this known theory, for images having a reduced bandwidth in the spatial frequency domain (namely, sparse images), it is possible to reduce the number of measurements necessary to reconstruct the image with respect to the number indicated by the known Shannon-Nyquist sampling theorem. The known Compressive Sensing scheme is described in, for instance, R. G. Baraniuk, "Compressive Sensing [Lecture Notes]," IEEE Signal Process. Mag. 24, 118-121 (2007).

The Single Pixel Camera scheme described above is hence particularly suitable in case of a sparse image. This is the case for images of samples comprising highly scattering media (for example, a biological tissue). In these cases, in fact, the medium behaves like a low-pass filter in the spatial frequency domain. Spatial sampling can be performed by acquiring only the coefficients of the spatial frequencies comprised in the bandwidth of interest.

In the Single Pixel Camera scheme, measurements are obtained using the digital modulator (i.e., the micromirror matrix) and then focusing the light on a single photodetector. Therefore, according to this scheme, two distinct components are required for, first, space modulate the light and then detect the resulting signal.

Arrays of photodetectors have recently been developed—for example SPAD (Single-Photon Avalanche Diode) arrays and SiPMs (Silicon PhotoMultipliers)—which allow obtaining high temporal resolution, with sensitivity to the single photon, and in which each element of the array can be selectively enabled/disabled.

The inventors noticed that the availability of such photodetector arrays allows realizing a device that, with reference to a Single Pixel Camera device, allows eliminating the need for a spatial optical modulator. This advantageously makes it possible to realize a time-resolved imaging device, which is cheap, simple and compact from the hardware point of view.

In the light of the above, an object of the present invention is to provide a device for detecting time-resolved optical data which allows acquiring time-resolved images under different spatial resolution requirements and which is more compact, from the hardware point of view, than a Single Pixel camera device. Another object of the present invention is to provide a corresponding method for detecting time-resolved optical data.

According to the present invention, the spatial sampling of an image is performed in the spatial frequency domain. The term "image" refers to an optical signal, in particular corresponding to the intensity of the electromagnetic field collected on a sensor through, for example, an optical system (e.g. a lens), wherein the signal is coming from the object under investigation when illuminated by a light source.

As known, spatial sampling in the spatial frequency domain requires the multiplication of the image by the functions of a vector space (the functions forming a basis for the vector space) and a subsequent integration. The method according to the present invention is based on the use of a sensor comprising an array of time-resolved detection elements, in which said elements can be selectively enabled. The detection elements are, for example, photodiodes. In practice, each function of the basis of the vector space is implemented at the sensor by means of a respective enabling pattern for the detection elements and the signal coming from the active elements is provided over a common line at the output of the sensor. If the sensor comprises detection elements operating in a single photon regime (for example, if the sensor comprises a matrix of SPAD diodes), the method according to the present invention is implemented by transferring to a timing circuit an output signal corresponding to the detection of the first photon arriving from the sample at any of the active detection elements, upon illumination of the sample by a light pulse. The timing circuit is preferably configured to recognize events and provide a digital representation of the time they occurred or the time interval between a start event and a stop event. The start event typically corresponds to the launch of the light excitation pulse, and the stop event typically corresponds to the detection of the first photon by the sensor. In particular, the timing circuit may be a time-to-digital converter (Time-to-Digital Converter, TDC), a time-to-amplitude converter (Time-to-Amplitude Converter, TAC) or any appropriate circuit capable of measuring a short time interval. In this way, the image is sampled both in the spatial frequency domain (because it is multiplied by the functions of the basis and integrated by the common line that connects all the detection elements) and in the time domain (because of the timing circuit). In addition, the time profile of the signal is also recorded, through implementation of the Time Correlated Single Photon Counting (TCSPC) technique, or any equivalent technique, at the timing circuit, with a resolution of a few tens of picoseconds.

Several bases may be considered for spatial sampling, including orthonormal wavelets, or other sets of orthonormal functions, such as the base functions of a Fourier space. By increasing the number of patterns implemented at the sensor it is possible to increase the spatial resolution of the acquired image, maintaining a high temporal resolution.

It follows from the above that the device of the present invention is advantageously capable of adaptively acquiring images with low or high spatial resolution, depending on the considered application. Indeed, as mentioned above, while images of samples comprising highly scattering media (for example, a biological tissue) have low spatial resolution, in other applications, such as, for example, environmental monitoring and self-driving cars, higher spatial resolutions could be required.

According to a first aspect, the present invention provides a device for detecting time-resolved optical data, the device comprising:
  a sensor comprising a number of detection elements configured to detect a light signal in a single photon regime;
  a timing circuit connected to the number of detection elements; and
  a control module connected to the sensor, the control module being configured to selectively enable the detection elements of the sensor according to a set of enabling patterns,
wherein the timing circuit is configured to measure a time of arrival of an output signal from the detection elements on said common line, the output signal being indicative of the detection of a photon of the light signal by any of the enabled detection elements.

Preferably, the sensor comprises a matrix of photon avalanche diodes or a digital silicon photomultiplier.

Preferably, the timing circuit is a time-to-digital converter.

Preferably, the timing circuit is configured to implement a time-correlated single-photon counting technique.

Preferably, the device further comprises an activation module configured to generate commands for the control module to implement the enabling patterns at the detection elements.

Preferably, the enabling patterns represent a set of base functions, more preferably orthonormal base functions, and even more preferably orthonormal wavelets.

According to an exemplary embodiment of the present invention, the enabling patterns are Hadamard patterns.

Preferably, the connection between the detection elements and the timing circuit comprises a wired OR connection.

According to embodiments of the present invention, the timing circuit is connected to all detection elements of the sensor through a single wired OR connection.

According to other embodiments of the present invention, the detection elements of the sensor are subdivided in a pre-defined number of subsets, each subset comprising a given number of detection elements, and wherein each subset of detection elements is connected to a respective timing circuit through a respective wired OR connection.

According to a second aspect, the present invention provides a method for detecting time-resolved optical data, the method comprising:
a) providing a sensor comprising a number of detection elements;
b) selectively enabling the detection elements according to an enabling pattern of a set of pre-determined enabling patterns;
c) supplying to the detection elements a light signal;

d) detecting a photon of the light signal by any of the enabled detection elements and providing a corresponding output signal on a common line connecting the detection elements to a timing circuit; and e) at the timing circuit, measuring a time of arrival of the output signal, wherein the method provides for repeating steps b) to e) for each enabling pattern of the set of pre-determined enabling patterns.

Preferably, the light signal is a light signal provided by an object illuminated by a light pulse, and the method further comprises, for each enabling pattern of the set of enabling patterns, illuminating the object by a number of light pulses and repeating steps c) to e) for a number of times corresponding to the number of light pulses.

Preferably, step e) comprises implementing a time-correlated single-photon counting technique.

Preferably, the enabling patterns are Hadamard patterns and the method further comprises applying an inverse Hadamard transform to obtain time-resolved images of the object.

Profitably, the method further comprises selecting the pre-determined set of enabling patterns on the basis of a required spatial resolution.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
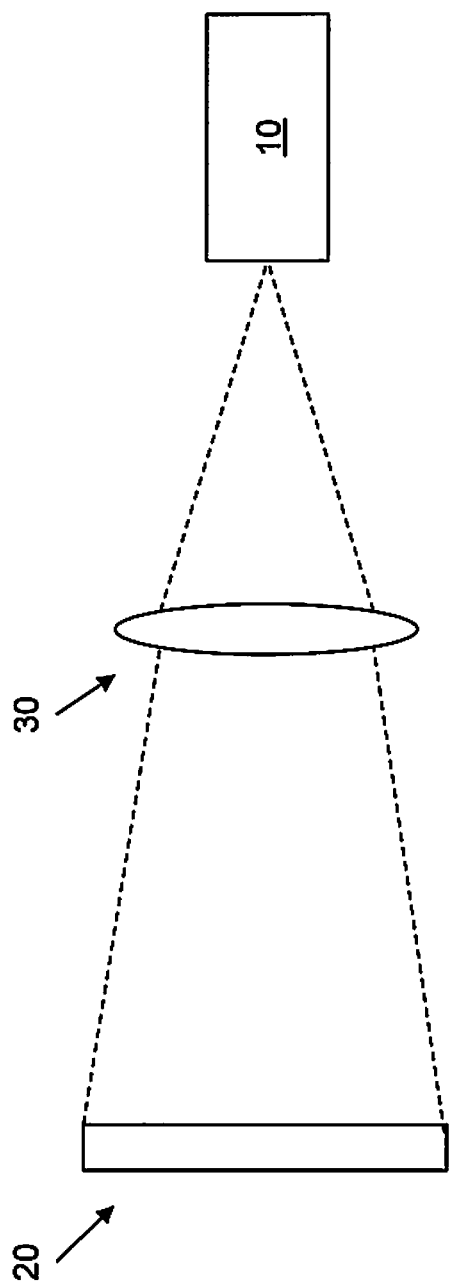
FIG. 1 schematically shows an exemplary application scenario for the present invention.

FIG. 1 schematically shows an exemplary application scenario of the time-resolved optical data detection device according to the present invention. The detection device (or, detector) according to the present invention is shown in FIG. 1 associated with the reference number 10. In this exemplary scenario, a sample object 20 under investigation is illuminated by a light source (e.g. a laser). In particular, the light source is preferably configured to periodically emit a light pulse within a certain repetition rate. At each light pulse incident on the sample object 20, the light that comes from the object 20 is then focused on the device 10 through an optical system 30, represented for the sake of simplicity in FIG. 1 by a single lens. The light source can be any kind of pulsed laser. Pulse duration, repetition rate and spectral bandwidth can be chosen depending on the particular application. As an example, a pulsed diode laser providing pulses of about 100 ps, at the wavelength of 650 nm, with a repetition rate of 40 MHz can be used for tissue characterization. A supercontinuum fiber laser, configured to provide pulses having a width of the order of ps, at a variable repetition rate ranging from 2 to 80 MHz can be used, combined with a proper spectral filter, for fluorescence lifetime imaging or tissue characterization as well. Pulsed laser diodes or solid-state lasers (e.g. erbium) in the eye-safe spectral region can be conveniently used for range finding applications.

Figure 2:
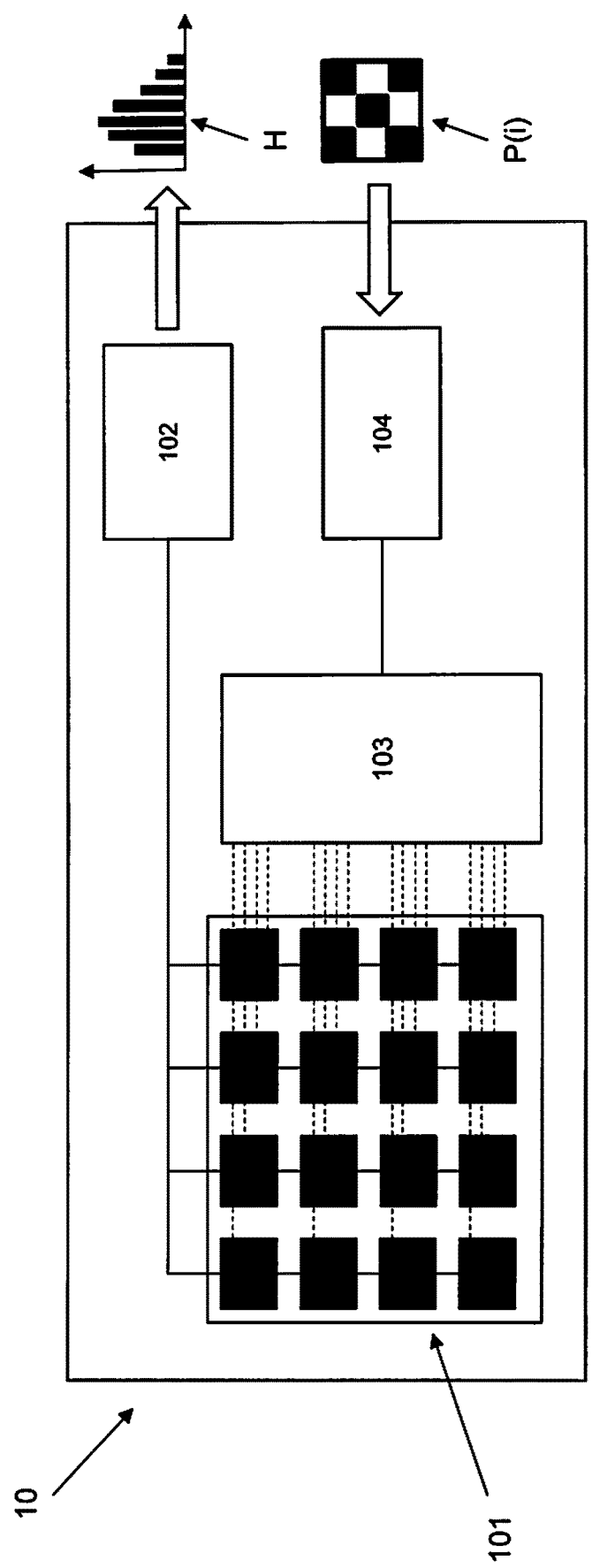
FIG. 2 is an exemplary block scheme of a device according to embodiments of the present invention.

FIG. 2 shows a block scheme of the detection device 10 according to embodiments of the present invention.

Preferably, the detection device 10 comprises a sensor 101 comprising in turn a plurality of detection elements (also referred to hereinafter as "pixels") arranged in a matrix. For sake of example, FIG. 2 shows a matrix of 4×4 detection elements. According to the present invention, the pixels of the sensor 101 operate preferably in a single photon regime. Moreover, preferably, each pixel can be activated and deactivated selectively, as it will be described in greater detail below. For example, the sensor 101 may comprise a matrix of photon avalanche diodes (SPADs), or a digital silicon photomultiplier (dSiPM).

According to an embodiment of the present invention, all pixels are connected to a single, shared, timing circuit 102. The timing circuit 102 may be, for instance, a time-to-digital converter (TDC). The connection between the detection elements and the timing circuit 102 is preferably implemented as a wired OR connection, in particular as a common cathode line connection. When a photon is detected by one of the enabled pixels of the sensor 101, this pixel provides an output signal over its connection to the timing circuit 102. In the common cathode line configuration cited above, upon the photon detection, the pixel may provide a current pulse at its anode terminal, and the supply current on the common cathode may have a short pulse as well. The timing circuit 102 is configured to measure the arrival time of the individual photons from the sample object under investigation by measuring the time of arrival of the corresponding output signal with respect to a synchronization signal indicating a reference time. The reference time is typically the emission time of the corresponding light pulse from the considered light source. Preferably, the timing circuit 102 is configured to implement the TCSPC technique mentioned above and to generate a histogram (indicated with letter "H" in FIG. 2) that represents the time behaviour of the light originating from the sample object upon pulsed illumination.

The detection device 10 further comprises, preferably, a control module 103, connected to the sensor 101, which is configured to implement an enabling pattern provided by an activation module 104. The activation module 104 receives the pattern as an input and feeds it into the control module 103 with an appropriate set of commands. The control module 103 and the activation module 104 can be implemented by the same hardware.

More in particular, the control module 103 is preferably configured to enable/disable the pixels of the sensor 101 in a selective manner. Selective activation of the pixels is preferably performed on the basis of a set of enabling patterns P(i), i=1, . . . , M, each enabling patterns being implemented at the pixels by means of a set of commands provided to the control module 103. The set of enabling patterns P(i) represents a set of M pre-defined base functions suitable to represent the signal to be sampled according to the known compressed sensing technique already mentioned above (where M is an integer number greater than 1 and i is an integer index). More preferably, the pre-defined base functions are orthonormal functions. For example, the base functions can be orthonormal wavelets or base functions of a Fourier space. The activation module 104 is preferably configured to generate and store the commands used to implement the enabling patterns P(i), i=1, . . . , M by the control module 103 at the pixels of the sensor 101.

Figure 3:
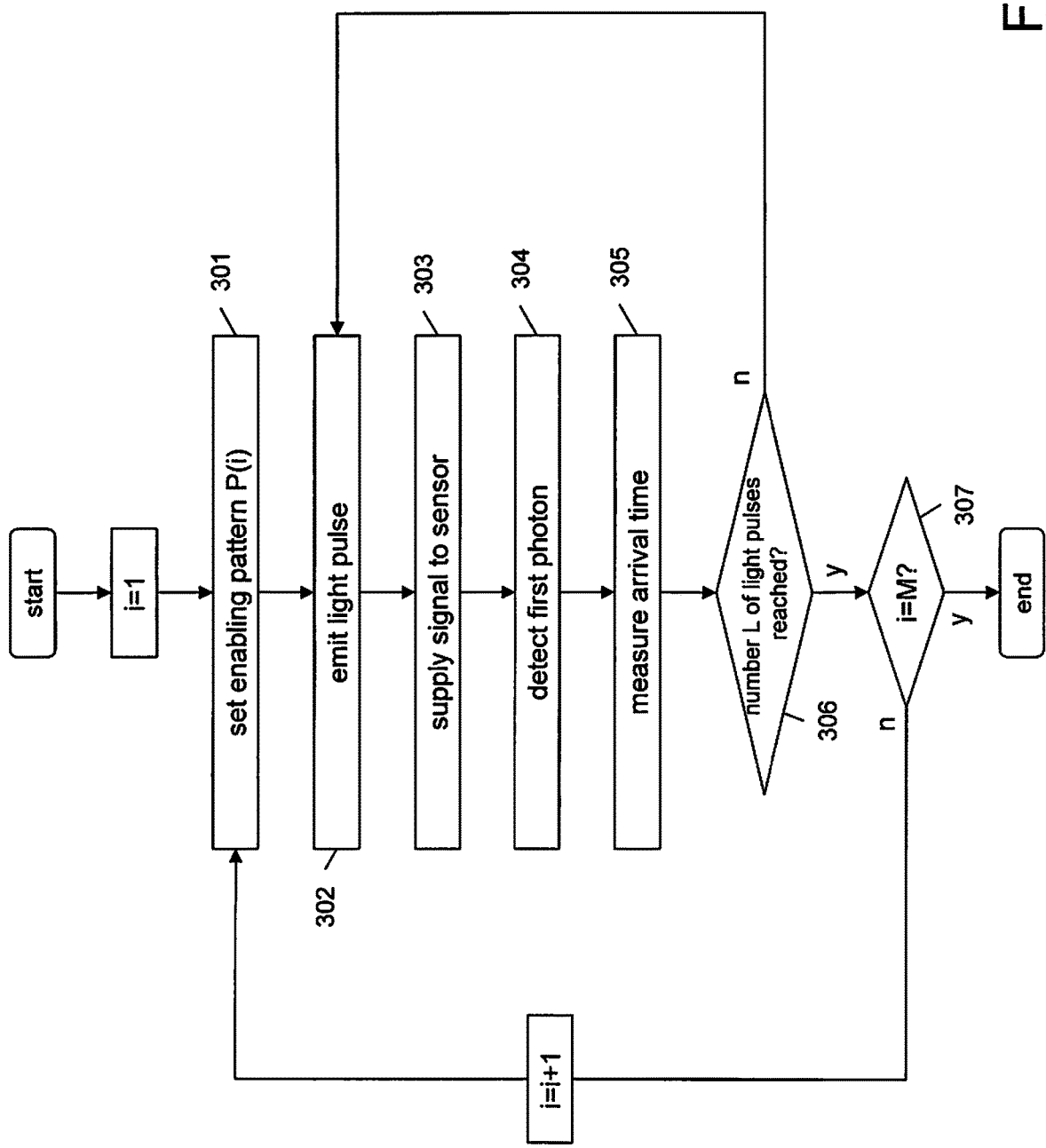
FIG. 3 is a flowchart illustrating steps of the method according to the present invention.

The method according to the present invention as implemented by the detection device 10 described above will be hereinafter described with reference to the flowchart of FIG. 3.

The method of the present invention provides for, before starting acquiring an image of the sample object 20, choosing the set of enabling patterns P(i), i=1, . . . , M. Then, the control module 103 preferably enables/disables the sensor detection elements 101 according to a first enabling pattern P(1) of the chosen set of enabling patterns (step 301). At this point, in order to take an image of the object 20, a light source (for example, a laser) illuminates the sample object 20, in particular by emitting a short light pulse, having a width, for example, from several femtoseconds to few nanoseconds (step 302). The signal coming from the sample object 20 in response to the light pulse is supplied to the detector 10 and in particular to the sensor 101 through the optical system 30 (step 303). When the first photon is detected by any of the enabled detection elements of the sensor 101, an output signal, which may be a current pulse, is generated on the line that connects the sensor 101 to the timing circuit 102 (step 304). The arrival time of this current pulse is measured at the timing circuit 102 (phase 305) with reference to the time of the light pulse emission from the source. This measurement may be used to implement the known TCSPC technique that further relies on the arrangement of the time stamps of the detected photons in a set of time bins in order to generate the histogram that represents the time behaviour of the light originating from the sample. At this point, steps 302-305 are preferably repeated. In particular, the sample object 20 under investigation is repeatedly illuminated by means of a number of light pulses equal to L (in which L is an integer greater than 1), wherein said pulses are periodically emitted by the source during a pre-determined time window or until a pre-determined detected signal level is reached. During this time window, the timing circuit 102 preferably measures the arrival time of the current pulses generated by the pixels which, from time to time, detect the first photon coming from the sample object 20 when it is hit by the light pulses. Preferably, according to the TCSPC technique, the timing circuit 102 provides the information to organize the measured data in the histogram already described above, which represents, as a function of time, the integral in space of the signal coming from the sample object 20 multiplied by the specific enabling pattern P(1) used to enable/disable the detection elements of the sensor 101. Once the measurements relative to all the L light pulses have been collected (step 306), the procedure described above relating to the steps 301-306 is preferably repeated for each enabling pattern P(i) of the considered set of enabling patterns.

In this way, the signal coming from the object under investigation is sampled in space and time with a high temporal resolution. The image of the object can then be reconstructed by applying an inverse transform operation or other techniques, such as the technique described in M. F. Duarte, M. A. Davenport, D. Takhar, J. N. Laska, T. S. T. Sun, K. F. Kelly, and R. G. Baraniuk, "Single-Pixel Imaging via Compressive Sampling," IEEE Signal Process. Mag. 25, (2008). By applying the inverse transform operation, a stack of gated images of the sample object is preferably obtained as a function of time.

According to embodiments of the present invention, the patterns used to enable the sensor detection elements 101 may be, for example, Hadamard patterns, which are described for example in Nam Huynh et al., "Single-pixel optical camera for video rate ultrasonic imaging", Vol 3, No. 1, January 2016, Optica, page 27 in combination with supplement 1, page 2. In this case, at the end of the detection procedure described above, by applying an inverse Hadamard transform it is possible to obtain a stack of gated images of the object under investigation as a function of time. This operation is known and will not be further described here below.

The inventors have performed some tests of a prototype of the detector according to the present invention. In particular, the inventors used a supercontinuum laser source to generate light pulses of about 10 ps duration with a repetition rate of about 2 MHz. The radiation emitted by the laser is spectrally filtered to achieve a narrow spectral band around a specific wavelength and coupled to an optical fiber. The distal end of the fiber is connected to a collimator which provides a beam of about 2 mm diameter.

The detector is based on a commercial digital silicon photomultiplier (dSiPM) designed for high energy radiation, which has been modified and configured to provide an array of 16×16 pixels made by single-photon avalanche diodes (SPADs). The SPADs, which can be activated or deactivated, are connected through a common line to a TDC integrated into the detector. A synchronization signal is fed from the laser into the detector to provide an appropriate time reference. When any of the active SPADs detects the first photon, the TDC measures the time between the synchronization signal and the avalanche signal. An integrated counter counts the number of photons detected by the whole array. The distribution of single photon events is arranged in a set of time bins and generates a histogram that represents the time behaviour of the light originating from the sample. This procedure conforms the standard implementation of the well known TCSPC method.

Figure 4:
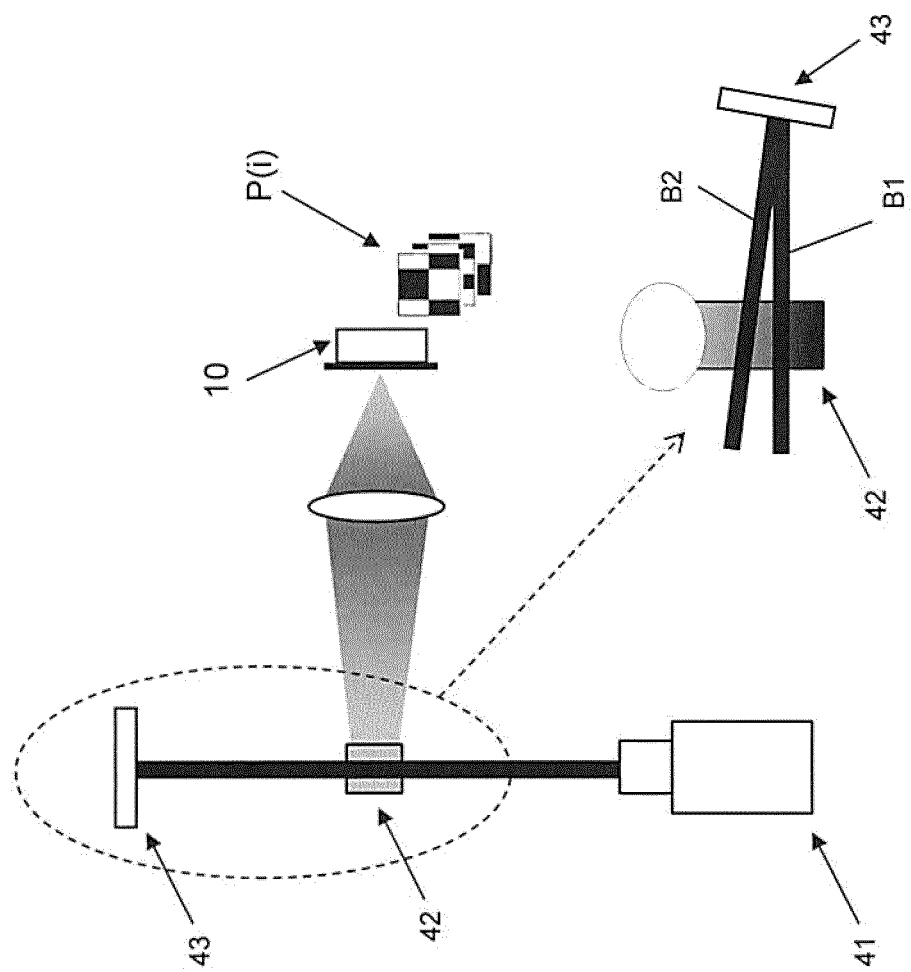
FIG. 4 illustrates a measurement setup used by the inventors for carrying out tests on the device of FIG. 2.

The measurement set up illustrated in FIG. 4 is related to an experimental test carried out by the inventors. FIG. 4 comprises a top view and an expanded side view of the experimental set up. The experimental test relates to time-resolved fluorescence imaging. In this experiment, a laser source 41 was used, whose emission was set at 630 nm with 5 nm bandwidth. The light beam travelled twice through a cuvette 42 filled with a fluorescent dye (Nile Blue). The double passage of the light inside the cuvette was achieved through a delay line comprising a mirror 43 placed 40 cm far away from the cuvette. The beam reflected by the mirror 43 was slightly tilted so that the fluorescence signal originated by the passage of the reflected beam (indicated by reference symbol B2 in FIG. 4) in the cuvette 42 was temporally and spatially separated from the fluorescence signal originated from the passage of the incoming beam (indicated by reference symbol B1 in FIG. 4). A long-pass filter with cut-off wavelength at 650 nm was placed in front of the detector 10 to remove the excitation light.

Figure 5:
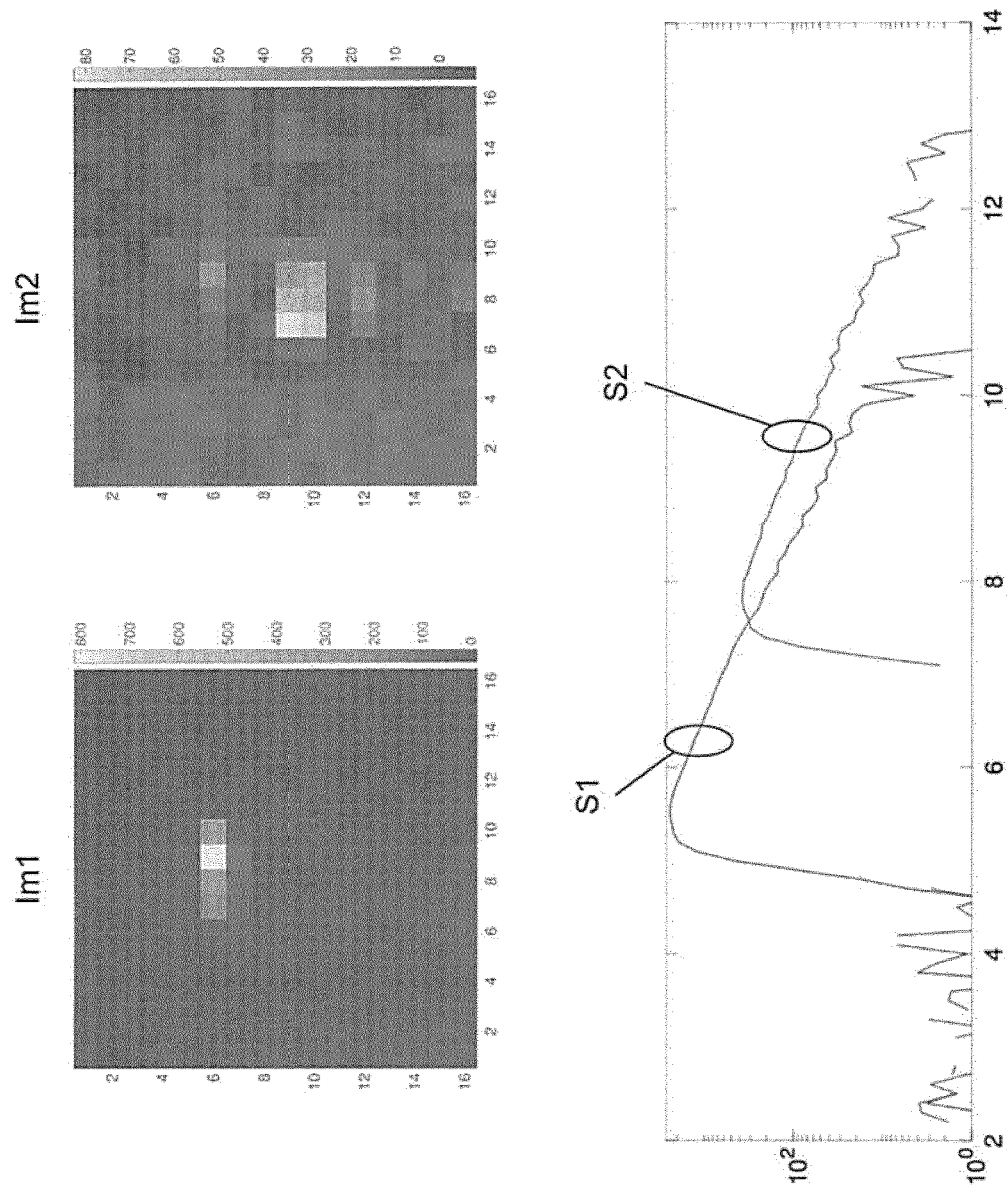
FIG. 5 shows the results of a test carried out by the inventors with the measurement setup of FIG. 4.

FIG. 5 shows two time-gated images of the fluorescence signal emitted by the dye inside the cuvette. The image on the top left of FIG. 5 (labelled as "Im1") shows the trace of the incoming laser beam while the image on the top right (labelled as "Im2") of FIG. 5 shows the trace of the laser beam reflected by the mirror. The two images are delayed by 5 ns from one another. FIG. 5 also shows the time profiles S1, S2 extracted from the highest intensity pixel of each image. S1 indicates the time profile of the highest intensity pixel in image Im1, while S2 indicates the time profile of the highest intensity pixel in image Im2. The test demonstrates the capability of the method and the detector according to the present invention to record an image resolved in space and time.

According to the present invention, the selection of the set of enabling patterns performed at step 301 described above may be adapted to the sample. Indeed, selection of the type and/or the number of enabling patterns may be profitably based on a required spatial resolution, which may vary according to the specific application involved. In particular, a higher spatial resolution may be required for instance in LIDAR applications or in microscopy. In this case, a greater number of patterns is used. On the other side, a lower spatial resolution might be sufficient in other applications involving for instance the light propagation in highly scattering media, such as biological tissues. In this case, few patterns already give a rough reconstruction of the spatial profile. Advantageously, according to these embodiments of the present invention, it is possible to tune the acquisition time to the required spatial resolution. Moreover, by tailoring the patterns to the properties of the sample object (e.g. morphology, optical properties, etc.), it is possible to optimize the acquisition time. The adaptation can be simply provided by the selection of the "best" number of patterns before acquiring the image or it can be provided during the acquisition, by changing the number and type of spatial enabling patterns on the basis of the previous measurements. The adaptation might require the definition of a merit function that optimizes the process depending on the specific application. For example, the merit function could rely on the information content, such as the sharpness of the image or the signal-to-noise ratio, and could take into account possible constraints on the acquisition time.

According to other profitable embodiments of the present invention, the pixels of sensor 101 may be subdivided in a pre-defined number of subsets, each subset comprising a given number of pixels. Each subset of pixels is then connected to a respective timing circuit through a respective wired OR connection, preferably using a common cathode connection. This advantageously allows parallelizing the detection operation and improving the frame-rate for applications involving very fast changing scenarios. By selecting the number of subsets of pixels according to these embodiments of the present invention, it is possible to tune the achievable acquisition time to the user's needs. Moreover, this subset division can be used for exploring a further dimension such as wavelength. In fact, through a dispersive element like a diffraction grating, it is possible to image the target image on each subset of pixels at a different wavelength to get a multispectral, time-resolved image hypercube.

The method of the present invention allows implementing a time-resolved camera based on the compressive sensing approach. The method has been implemented in a prototype device that has been experimentally validated by temporally and spatially monitoring the light propagation through a fluorescent dye. The proposed scheme implements the known advantages of compressed sensing in a cheap, simple and compact hardware. Indeed, all the required subunits and functional steps have been unified into a single device: space modulation, space integration and detection are all performed in the same chip, without the need of an external spatial modulator.

As discussed above, the proposed approach is adaptive as it provides the possibility to tune the acquisition process to the required spatial resolution and available time.

Moreover, the approach is based on a detector whose most complex component, namely the timing circuit, is shared among a number of pixels or even among all pixels, still preserving precise photon timing across all the detection elements. This allows simplifying the circuitry required for each pixel and hence increasing the fill factor of the detector. Moreover, the number of pixels can be greatly increased, while the fabrication cost reduces due to the lower silicon area required with respect to implementations using a single timing circuit for each pixel. Another advantage is given by the limited volume of data to be transferred compared to configurations using one timing circuit for each pixel. Finally, a very fast data acquisition is possible.

The invention claimed is:

1. A device for detecting time-resolved optical data, the device comprising:
   a sensor comprising a number of detection elements configured to detect a light signal in a single photon regime;
   a timing circuit connected to said number of detection elements through a common line; and
   a control module connected to said sensor, said control module being configured to selectively enable said detection elements of said sensor according to an enabling pattern selected from a set of pre-determined enabling patterns,
   wherein said timing circuit is configured to measure a time of arrival of an output signal from said detection elements on said common line, said output signal being indicative of the detection of a photon of said light signal by any of said enabled detection elements.

2. The device according to claim 1, wherein the sensor comprises a matrix of photon avalanche diodes or a digital silicon photomultiplier.

3. The device according to claim 1, wherein the timing circuit is a time-to-digital converter.

4. The device according to claim 1, wherein said enabling patterns represent a set of base functions.

5. The device according to claim 1, wherein said timing circuit is connected to all detection elements of said sensor through a single wired OR connection.

6. The device according to claim 1, wherein
   said detection elements of said sensor are subdivided in a pre-defined number of subsets, each subset comprising a given number of detection elements, and
   each subset of detection elements is connected to a respective timing circuit through a respective wired OR connection.

7. A method for detecting time-resolved optical data, the method comprising:
   a) providing a sensor comprising a number of detection elements;
   b) selectively enabling said detection elements according to an enabling pattern (P(i)) selected from a set of pre-determined enabling patterns;
   c) supplying to said detection elements a light signal;
   d) detecting a photon of said light signal by any of said enabled detection elements and providing a corresponding output signal on a common line connecting said detection elements to a timing circuit; and
   e) at said timing circuit, measuring a time of arrival of said output signal,
   wherein the method provides for repeating steps b) to e) for each enabling pattern of said set of pre-determined enabling patterns.

8. The method according to claim 7, wherein
   said light signal is a light signal provided by an object illuminated by a light pulse, and
   said method further comprises, for each enabling pattern of said set of pre-determined enabling patterns, illuminating the object by a number of light pulses and repeating steps c) to e) for a number of times corresponding to said number of light pulses.

9. The method according to claim 8, wherein step e) comprises implementing a time-correlated single-photon counting technique.

10. The method according to claim 7, further comprising selecting said set of pre-determined enabling patterns on the basis of a required spatial resolution.

* * * * *